United States Patent [19]

Kelly

[11] Patent Number: 4,809,963

[45] Date of Patent: Mar. 7, 1989

[54] ADJUSTABLE ENGINE STAND

[76] Inventor: Thomas J. Kelly, 32 Calla St., Providence, R.I. 02905

[21] Appl. No.: 72,256

[22] Filed: Jun. 23, 1987

[51] Int. Cl.$^4$ .................... B23Q 3/00

[52] U.S. Cl. .................... 269/296; 269/60; 269/299; 269/47

[58] Field of Search .................... 269/17, 60, 47, 50, 269/289 R, 296, 297, 299, 301, 900, 71; 254/133 R, 134

[56] References Cited

U.S. PATENT DOCUMENTS 1,415,968 5/1922 Wilson .................... 269/296

1,469,734 10/1923 Staley .................... 269/296

4,239,196 12/1980 Hangar .................... 269/17

*Primary Examiner*—Frederick R. Schmidt

*Assistant Examiner*—Judy J. Hartman

*Attorney, Agent, or Firm*—Salter & Michaelson

[57] ABSTRACT

An engine stand for transporting and storing an engine is universally adjustable to adapt it for use with a wide variety of engines of different sizes and configurations. The engine stand includes a base portion, a pair of upwardly extending front legs on the base portion, a pair of upwardly extending rear legs on the base portion, a pair of adjustable front mounting assemblies on the front legs and a pair of adjustable rear mounting assemblies on the rear legs. The front mounting assemblies are adjustable in vertical longitudinal and transverse directions relative to the base portion and the rear mounting assemblies are adjustable in vertical and transverse directions relative to the base portion to adapt the stand for receiving engines of various different sizes and configurations.

7 Claims, 3 Drawing Sheets

ADJUSTABLE ENGINE STAND

BACKGROUND AND SUMMARY OF THE INVENTION

The instant invention relates to accessories for internal combustion engines and more particularly to an engine stand which is adjustable for use in connection with a wide variety of engines of different types and sizes during transportation and storage thereof.

It has generally been found that the most effective and efficient way to store and/or transport internal combustion engines, such as automotive engines, is to mount them on stands which are adapted to support the engines in substantially level, slightly elevated dispositions on supporting surfaces. In this regard, it has been found that when automotive engines are supported on supporting surfaces without the use of engine stands, they generally assume tilted dispositions wherein oil and other fluids can leak from the engines and wherein the engines are inherently unstable so that they can be damaged relatively easily. Further, it has been found that when engines are transported or stored without the use of engine stands, they generally require greater amounts of storage space than engines which are stored or transported on engine stands. Accordingly, for these reasons, it has generally been found that it is advantageous to transport and store engines, such as used or rebuilt automotive engines, on engine stands.

While a variety of different types of engine stands have been heretofore available, they have generally only been adapted for use in combination with specific types and sizes of engines. Accordingly, even though heretofore the advantages of storing and transporting engines on engine stands have generally been recognized, due to the wide variety of different configurations and sizes of engines, it has not always been practical to mount and store engines on engine stands. Further, while a variety of relatively tall engine stands have been heretofore available for use while working on engines, stands of this type have generally been relatively top heavy and they have not been practical for use in transporting and storing engines. In this regard, exemplary engine stands of the prior art are disclosed in the U.S. Pat. Nos. to Carswell et al, 1,481,503; Bock, 2,409,468; Ross, 2,825,477; Kaplan et al, 3,218,056; Hanger, 239,196; Hawkins, 4,533,127. However, since these references fail to provide an effective engine stand which is universally adjustable and adapted for use in transporting and storing engines, they are believed to be of only general interest with respect to the instant invention.

The instant invention provides an effective engine stand which is adjustable to adapt it for use in transporting and storing a wide variety of engines, including various automotive engines. More specifically, the engine stand of the instant invention comprises a base portion having front and rear ends, a pair of upwardly extending front legs attached to the base portion adjacent the front end thereof, a pair of upwardly extending rear legs attached to the base portion adjacent the rear end thereof, a pair of front mounting assemblies mounted on the front legs adjacent the upper ends thereof, and a pair of rear mounting assemblies mounted on the rear legs adjacent the upper ends thereof. The base portion preferably comprises a pair of spaced, substantially parallel skid members having front and rear ends and a lower cross member which extends between the skid members, and the stand preferably further comprises an upper cross member which extends between the rear legs adjacent the upper ends thereof. An enlarged downwardly extending notch is preferably formed in the rear cross member; and the skid members, the rear legs and the upper cross member are preferably integrally formed from a single tubular member having a substantially square cross section. The front mounting assemblies are preferably adapted to be secured to the front side portions of an engine of a type having threaded engine mount holes therein, and the front mounting assemblies are adapted so that they are adjustable in vertical, longitudinal and transverse directions relative to the base portion. Further, the front mounting assemblies preferably comprise elongated front slide members which are longitudinally slidable and which are pivotable in transverse planes relative to the base portion and adjustably securable in various positions for adapting the front mounting assemblies to be secured to the opposite sides of an engine. The front mounting assemblies preferably further comprise elongated secondary slide members which are slidable in longitudinal directions relative to the base portion for longitudinally adjusting the front mounting assemblies to be secured to the opposite sides of an engine. The rear mounting assemblies are constructed so that they are adjustable in both vertical and transverse directions relative to the base portion, and they are preferably adapted to be secured to rearwardly facing threaded engine mount holes in the rear end of an engine. The rear mounting assemblies preferably comprise elongated slide members which are longitudinally slidable and which are pivotable in transverse planes relative to the base portion and adjustably securable in various positions for securing the rear mounting assemblies to the rear end of an engine. Further, the rear mounting assemblies are preferably adapted to be secured to threaded engine mount holes on the rear end of an engine.

For use and operation of the engine stand of the subject invention, the rear mounting assemblies are adjustable to various positions to enable them to be secured to the rear ends of a wide variety of engines of different types and sizes. The front mounting assemblies are also adjustable to enable them to be secured to the front side portions of a wide variety of different engines. In this regard, since the front mounting assemblies are adjustable in longitudinal directions relative to the base portion, they are adapted to compensate for the variations in the front-to-back lengths of various engines; and since both the front and rear mounting assemblies are adjustble in both vertical and transverse directions relative to the base portion, they are adapted to accommodate engines of various widths and heights. Further, since the upper cross member has an enlarged downwardly extending notch therein, the stand can accommodate certain engines having rearwardly extending crank shaft housings which otherwise could not be accommodated on the stand. Still further, since the skid members, the rear legs and the upper cross member are all integrally made from a single tubular member, the stand is adapted for relatively inexpensive constructions; and since the tubular member has a substantially square cross section, the stand nevertheless has a high degree of rigidity.

Accordingly, it is a primary object of the instant invention to provide an effective engine stand which is adjustable for transporting and storing a wide variety of engines of different types and sizes.

A further object of the instant invention is to provide a stable adjustable engine stand which is adapted for relatively inexpensive construction.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
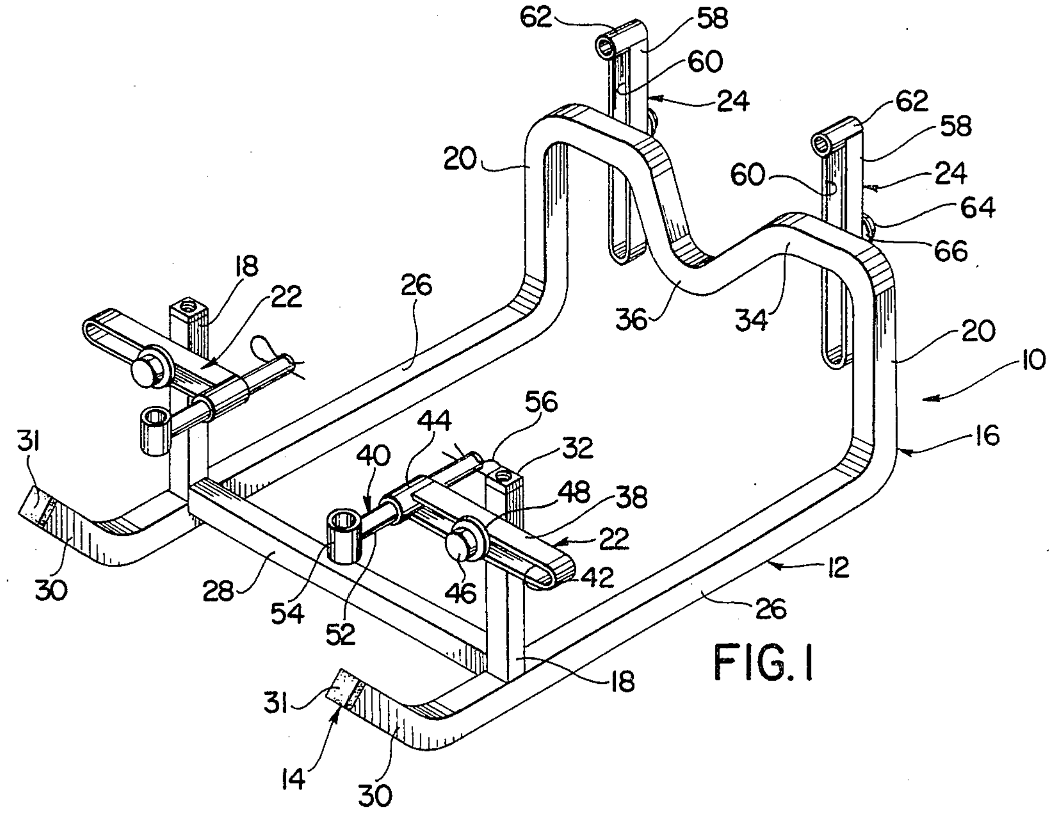
FIG. 1 is a perspective view of the engine stand of the instant invention.
Figure 2:
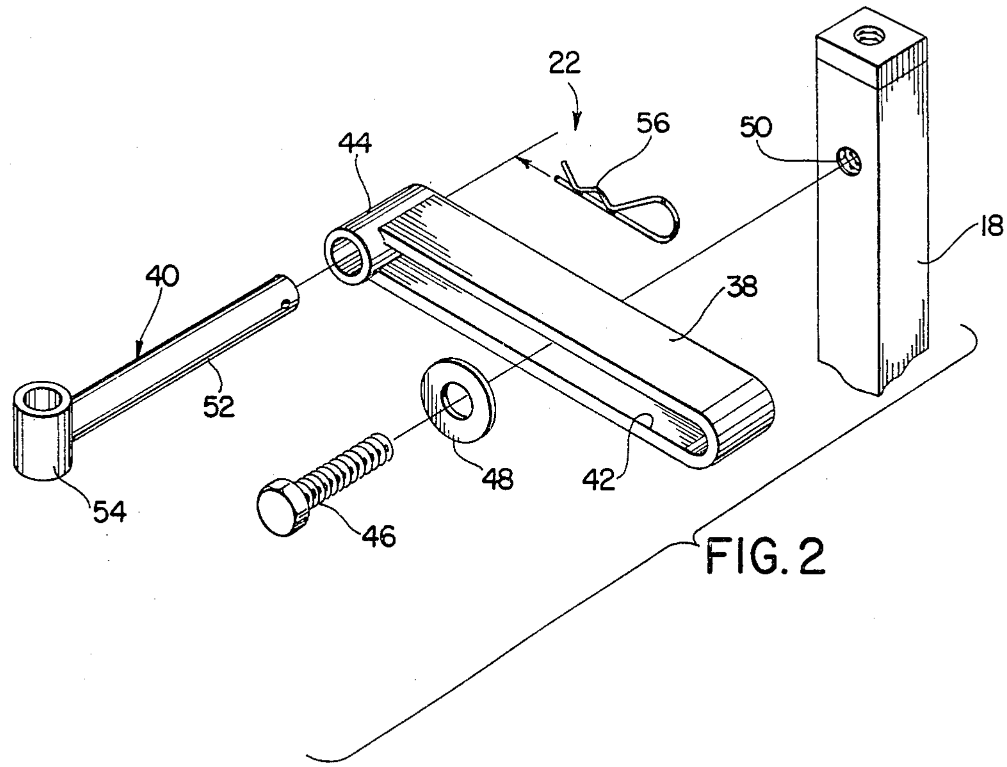
FIG. 2 is an exploded perspective view of one of the front mounting assemblies thereof.

Referring now to the drawings, the engine stand of the instant invention is illustrated and generally indicated at 10 in FIGS. 1 and 3-5. The engine stand 10 is adapted for transporting and storing engines, such as internal combustion automotive engines, and it is adjustable for receiving a wide variety of engines of different configurations and sizes thereon. The engine stand 10 comprises a base portion generally indicated at 12, having a front end generally indicated at 14 and a rear end generally indicated at 16, a pair of front legs 18 which extend upwardly from the base portion 12 adjacent the front end 14 thereof, a pair of rear legs 20 which extend upwardly from the base portion 12 adjacent the rear end 16 thereof, a pair of front mounting assemblies generally indicated at 22 mounted on the front legs 18 adjacent the upper ends thereof, and a pair of rear mounting assemblies generally indicated at 24 mounted on the rear legs 20 adjacent the upper ends thereof.

The base portion 12 preferably comprises a pair of spaced, substantially parallel skid members 26 which are connected adjacent the forward end of the base 12 with a cross member 28. The skid members 26 preferably have upwardly bent forward end portions 30 and they are preferably made from a tubular steel member having a substantially square cross section. The cross member 28 is preferably welded to the skid members 26 to provide a rigid construction in the base portion 12.

The front legs 18 are preferably also made from a tubular steel member having a substantially square cross section, and they are preferably welded to the skids 26 adjacent the front ends thereof so that they extend upwardly from the skids 26 as illustrated. Further, the front legs 18 preferably have heights of approximately 8 in. but in any event preferably less than approximately 1 ft.

The rear legs 20 are preferably integrally formed with the skid members 26 so that they extend upwardly from the skid members 26 adjacent the rear end 16 of the base portion 12. The rear legs 20 preferably have heights of less than approximately 12 in. and preferably of approximately 8 in. The rear legs 20 are preferably also integrally formed with a rear upper cross member 34 which extends between the rear legs 20 adjacent the upper ends thereof and has an enlarged downwardly extending centrally positioned notch 36 therein.

The front adjustment assemblies 22 are adjustably mounted on the front legs 18 adjacent the upper ends thereof so that they are adjustably securable to the front side portions of various engines. The front mounting assemblies 22 each comprise an elongated main front slide member 38 and a secondary front slide member 40. The main front slide members 38 are each formed with an elongated, longitudinally extending slot 42 therein, and they each further comprise a tubular sleeve 44 at one end thereof which extends in a direction which is substantially perpendicular to the respective slot 42 thereof. The main front slide members 38 are secured to their respective front legs 18 with bolts 46 and washers 48 so that the bolts 46 extend through the slots 42 in the slide members 38 and are received in threaded engagement in threaded apertures 50 on the front sides of the respective legs 18 thereof. The apertures 50 are preferably reinforced with internal threaded nuts or the like in the legs 18, and the front slide members 38 are secured to their respective legs 18 with the bolts 46 so that they can be adjustably positioned for securing the mounting assemblies 22 to various different engines. In this regard, the main front slide members 38 are adjustably secured to their respective front legs 18 so that the slide members 38 are longitudinally repositionable and pivotable in substantially transverse planes with respect to the base portion 12. The secondary slide members 40 each comprise an elongated cylindrical shaft portion 52 and a terminal sleeve portion 54 which is secured to the shaft portion 52 thereof in substantially perpendicular relation. The shaft portions 52 are received in the sleeve portions 44 of the main slide members 38 so that they are longitudinally slidable therein, and clips 56 are provided on the shaft portions 52 for preventing the secondary slide members 40 from being removed from their respective main slide members 38. Accordingly, the secondary slide members 40 are longitudinally repositionable in their respective sleeves 44 to longitudinally reposition the secondary slide member sleeve portions 54 with respect to the base portion 12. Further, the shafts 52 are rotatable in the sleeve portions 44 of their respective main slide members 38 to angularly reposition the secondary slide member sleeve portions 54.

The rear mounting assemblies 24 each comprise an elongated rear slide member 58 having an elongated, longitudinally extending slot 60 therein. The slide members 58 each include a tubular sleeve portion 62 on one end thereof, and the slide members 58 are secured to the rear side of the cross member 34 with bolts 64 and washers 66. In this regard, the bolts 64 are received in threaded engagement in threaded apertures (not shown) in the cross member 34; and, accordingly, the rear mounting assemblies 24 are actually mounted or supported on the rear legs 20 through the cross member 34. Further, the rear slide members 58 are longitudinally adjustable and pivotable in a plane which is substantially transverse to the base portion 12 by loosening the bolts 64. However, the sleeve portions 62 are always positioned in longitudinally extending directions relative to the base portion 12 so that they are securable to the rear end of an engine.

Figure 3:
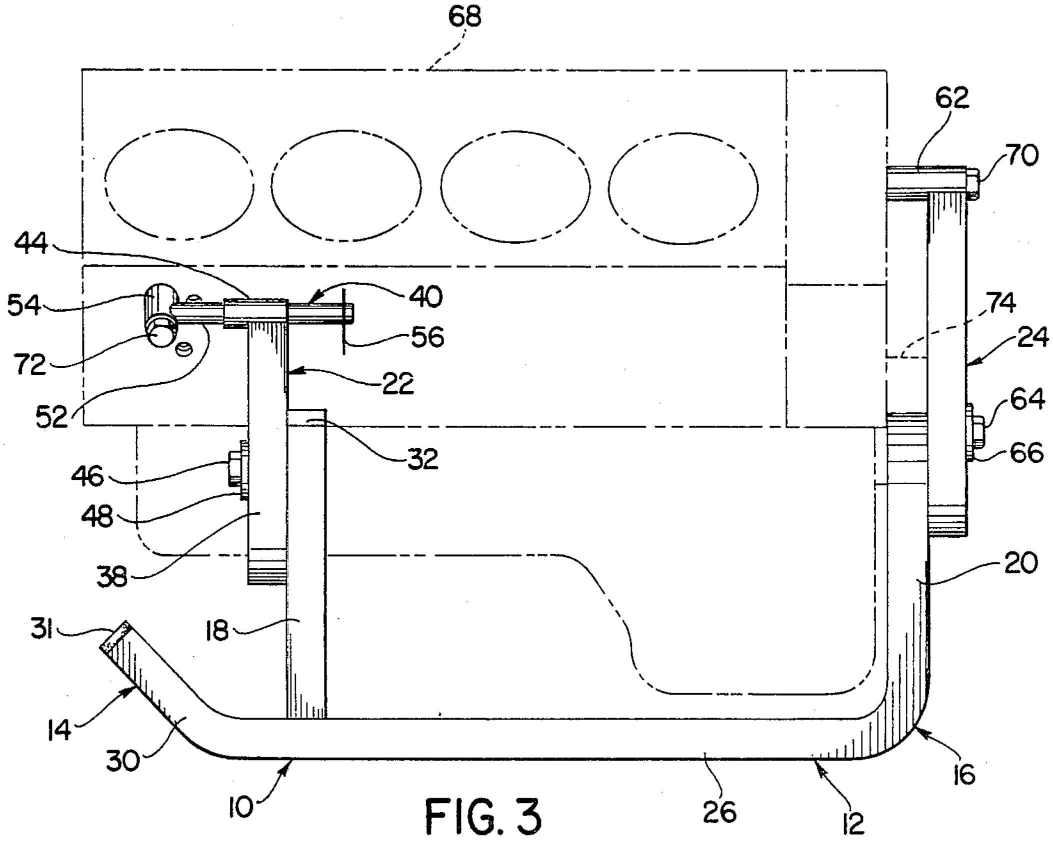
FIG. 3 is a side elevational view of the stand with an engine mounted thereon.
Figure 4:
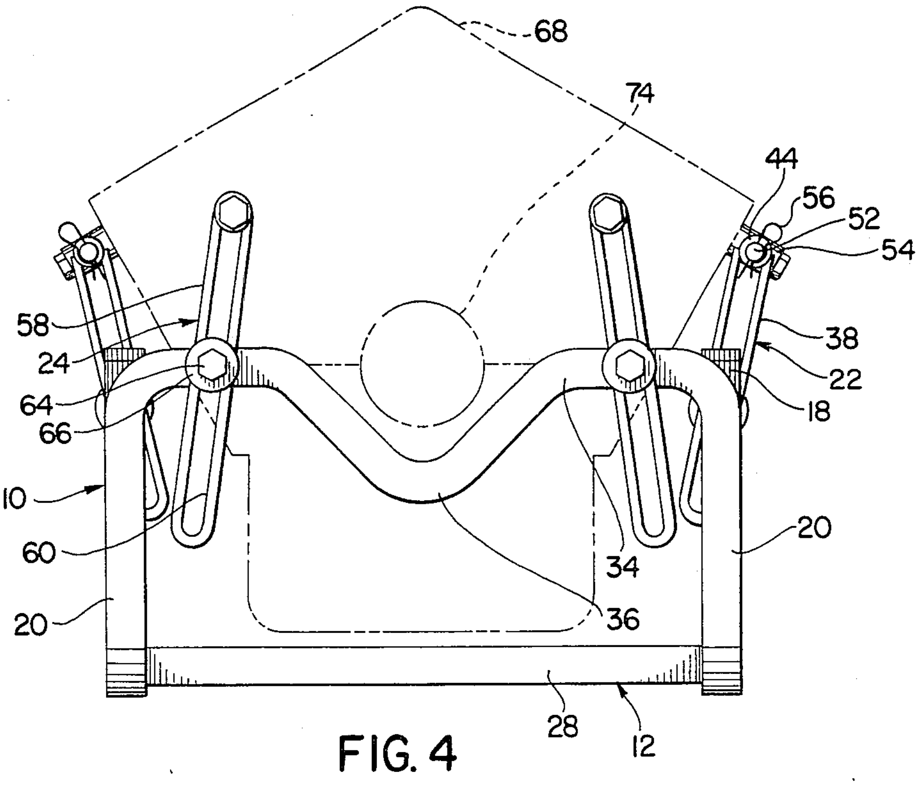
FIG. 4 is a rear elevational view of the stand.
Figure 5:
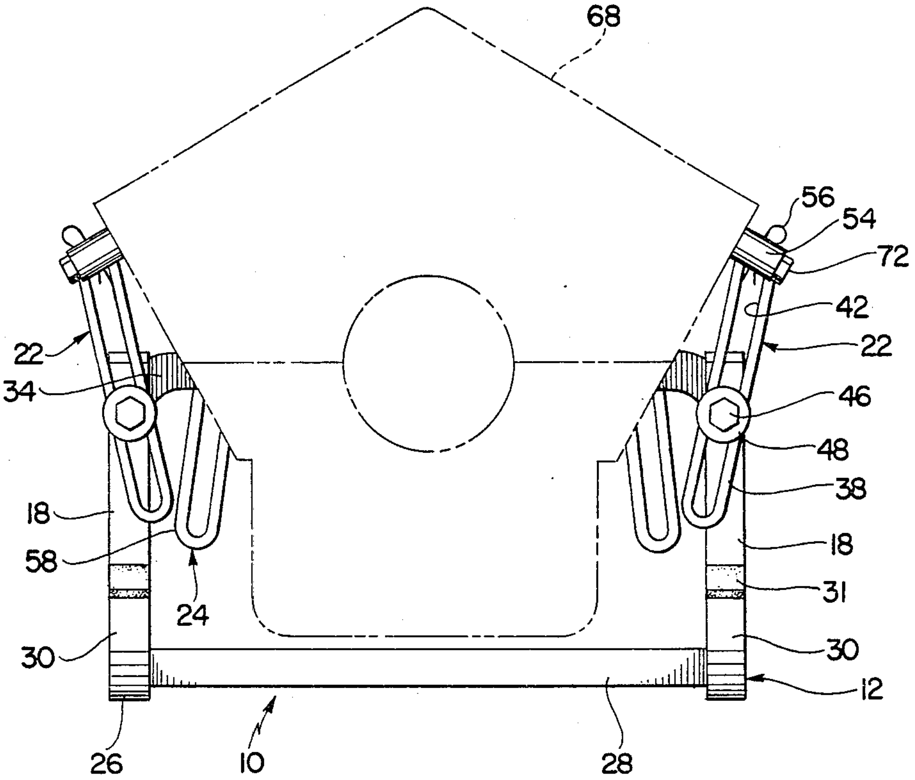
FIG. 5 is a front elevational view thereof.

For use and operation of the engine stand 10, the front and rear mounting assemblies 22 and 24 are adjustable to adapt the stand 10 to be mounted on various different specific types of engines, including the engine illustrated in FIGS. 3-5 and generally indicated at 68. In this regard, the rear mounting assemblies 24 are adjustable so that threaded bolts 70 are receivable through the sleeve portions 62 and are receivable in threaded engagement in the engine mount holes in the rear end of the engine 68. The front mounting assemblies 22 are adjustable so that the sleeve portions 54 thereof can be utilized in a similar manner for securing the mounting assemblies 22 to the front side portions of the engine 68 with threaded bolts 72 which extend through the sleeve portions 54 and into motor mount holes in the front side portions of the engine 68. Alternatively, the front mounting assemblies 22 can be adapted to be secured to an engine via motor mount holes which face rearwardly from the front end of the engine by removing the secondary slide portions 40 from the sleeves 44 and inserting threaded bolts through the sleeves 44 to bolt the main slide members 38 directly to the engine. In any event, once an engine has been mounted on the stand 10, the notch 36 in the rear cross member 34 provides clearance for a crank shaft housing, such as the housing 74 on the rear end of the motor 68. Further, the stand 10 is operative for mounting an engine such as the engine 68 in a substantially level and stable condition so that it can be effectively transported and stored.

It is seen therefore, that the instant invention provides a highly effective engine stand. The mounting assemblies 22 and 24 are universally adjustable to adapt the stand 10 for receiving a wide variety of engines of different configurations and sizes thereon. Further, once an engine has been mounted on the stand 10, it can be effectively supported in a substantially level and highly stable condition so that damage to the engine 68 during transportation and storage is minimized. Further, the potential for leaking fluids, such as oil from the engine 68, is minimized; and the engine 68 can be effectively stored in a minimal amount of storage space. Accordingly, for these reasons, as well as the other reasons hereinabove set forth, it is seen that the engine stand of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A stand for an engine of a type having opposite front and rear ends and opposite sides, said stand comprising:

a. a base portion having front and rear ends and including a pair of spaced, substantially parallel skid members extending in a longitudinal direction having front and rear ends and having front and rear ends and at least one lower cross member extending in a transverse direction between said skid members, the front end portions of said skid members being bent upwardly;

b. a pair of spaced front legs extending upwardly from said skid members adjacent the front ends thereof and terminating in free upper ends;

c. a pair of spaced upwardly extending rear legs extending integrally upwardly from the rear ends of said skid members terminating in upper ends;

d. an upper cross member extending integrally between the upper ends of said rear legs;

e. said skid members, said rear legs and said upper cross member being integrally formed from a single continuous tubular member having a substantially square cross section;

f. front mounting means on said front legs adjacent the upper ends thereof, said front mounting means being adjustable in vertical, longitudinal and transverse directions relative to said base portion and being securable to opposite side portions of said engine adjacent a front end portion of the engine for supporting the front end portion of said engine on said front legs;

g. rear mounting means mounted on said rear legs adjacent the upper ends thereof, said rear mounting means being adjustable in both vertical and transverse directions relative to said base portion and being securable to a rear end portion of said engine for supporting the rear end portion of said engine on said rear legs.

2. In the engine stand of claim 1, said rear mounting means each comprising an elongated rear slide member which is slidable and pivotable in a transverse plane relative to said base portion and adjustably securable in various positions for securing it to the rear end portion of said engine.

3. In the engine stand of claim 2, said engine being of a type having rearwardly facing threaded engine mount holes in the rear end portion thereof, said rear mounting means being securable to said engine with threaded bolts which are received in threaded engagement in said engine mount holes.

4. In the engine stand of claim 1, said front mounting means each comprising an elongated main front slide member which is slidable and pivotable in a transverse plane relative to said base portion and adjustably securable in various positions for adapting said front mounting means to be secured to the opposite side portion of said engine.

5. In the engine stand of claim 4, said front mounting means each further comprising an elongated secondary front slide member which is slidable in a longitudinal direction relative to said base portion for longitudinally adjusting said front mounting means to be secured to the opposite side portions of said engine.

6. In the engine stand of claim 2, said front mounting means each comprising an elongated main front slide member which is longitudinally slidable and which is pivotable in a transverse plane relative to said base portion and adjustably securable in various positions for adapting said front mounting means to be secured to the opposite side portions of said engine.

7. In the engine stand of claim 6, said front mounting means each further comprising an elongated secondary front slide member which is slidable in a longitudinal direction relative to said base portion for longitudinally adjusting said front mounting means to be secured to the opposite side portions of said engine.

* * * * *